(12) United States Patent
McEwen, IV et al.

(10) Patent No.: US 7,280,433 B2
(45) Date of Patent: Oct. 9, 2007

(54) DEVICE AND METHOD FOR SONAR MEASUREMENT OF A SWIMMING POOL

(76) Inventors: Robert J. McEwen, IV, 1606 #34 Sharon Rd. West, Charlotte, NC (US) 28210; Jeffrey D. McEwen, 610 Shelton St., Charlotte, NC (US) 28270

( * ) Notice: Subject to any disclaimer, the term of this patent is extended or adjusted under 35 U.S.C. 154(b) by 163 days.

(21) Appl. No.: 11/237,524

(22) Filed: Sep. 28, 2005

(65) Prior Publication Data

US 2006/0067163 A1 Mar. 30, 2006

Related U.S. Application Data

(60) Provisional application No. 60/613,806, filed on Sep. 28, 2004.

(51) Int. Cl.
*G01S 15/88* (2006.01)
(52) U.S. Cl. .......................................... 367/96
(58) Field of Classification Search .................. 367/96; 702/55; 52/169.7, 745.02
See application file for complete search history.

(56) References Cited

U.S. PATENT DOCUMENTS

| | | | |
|---|---|---|---|
| 3,513,444 A | 5/1970 | Henderson et al. | |
| 3,978,444 A | 8/1976 | Hitchcock | |
| 4,420,762 A | 12/1983 | Andrews | |
| 4,661,933 A | 4/1987 | Seeman et al. | |
| 4,730,190 A | 3/1988 | Win et al. | |
| 4,829,493 A | 5/1989 | Bailey | |
| 4,870,623 A | 9/1989 | Buckley et al. | |
| 4,873,676 A | 10/1989 | Bailey et al. | |
| 5,068,835 A | 11/1991 | Reed | |
| 5,184,330 A | 2/1993 | Adams et al. | |
| 5,256,908 A | 10/1993 | Averbuch et al. | |
| 6,202,034 B1 | 3/2001 | Li | |
| 6,421,299 B1 | 7/2002 | Betts et al. | |
| 6,571,635 B1 | 6/2003 | Baltzersen et al. | |
| 6,628,569 B1 | 9/2003 | Steiner et al. | |
| 6,693,847 B2 | 2/2004 | Betts | |
| 6,813,585 B2* | 11/2004 | Leutz et al. | 702/158 |
| 2006/0067163 A1* | 3/2006 | McEwen et al. | 367/96 |

* cited by examiner

*Primary Examiner*—Daniel Pihulic
(74) *Attorney, Agent, or Firm*—Alston & Bird LLP

(57) ABSTRACT

A device and method for measuring a swimming pool and manufacturing a liner therefor are provided. The device includes a transducer that can be placed in the pool and configured to transmit sonic energy toward the inner surfaces of the pool. The transducer can determine relative positions of a plurality of coordinate points defined by the surfaces according to reflections of the sonic energy that are received from the surfaces. Coordinate data, which is characteristic of the positions of the coordinate points on the multiple surfaces of the pool, is stored in a memory device. The coordinate data can be used to control a liner cutting device to cut liner material to sizes corresponding to the multiple inner surfaces of the pool.

26 Claims, 6 Drawing Sheets

DEVICE AND METHOD FOR SONAR MEASUREMENT OF A SWIMMING POOL

CROSS-REFERENCE TO RELATED APPLICATIONS

This application is related to commonly owned provisional Application No. 60/613,806, filed Sep. 28, 2004, which is hereby incorporated herein in its entirety by reference.

FIELD OF THE INVENTION

This invention relates to a device and method for sonar measurement and, more particularly, to the use of sonic energy for measuring a swimming pool in connection with the manufacture of a custom-fit liner for the pool.

BACKGROUND OF THE INVENTION

Conventional in-ground swimming pools are often constructed by fitting a liner to a hole in the ground. The liner, which is typically formed of vinyl such as polyvinyl chloride (PVC), provides a waterproof barrier for retaining the water in the pool. Harsh conditions such as the variable acidity of the water, chlorine and other chemicals in the water, and exposure to sunlight can degrade the liner, and the liner can be otherwise worn or damaged. Therefore, such liners are typically replaced periodically, thereby requiring a new liner to be fitted to the pool. Vinyl liners can also be fitted to existing concrete swimming pools to stop water from leaking through the concrete. In addition, pool liners are available in a variety of colors and decorative patterns and are sometimes replaced to improve the aesthetic appeal of the pool.

Each swimming pool is typically at least slightly different in size or shape. Therefore, in order to achieve a good fit of the liner to the pool, the liner is typically custom manufactured to the dimensions of the particular pool. According to one method of measuring a pool in order to fit a liner, a contractor undertakes the time-consuming chore of measuring the length, width, and depth of the various portions of the swimming pool with a measuring tape. The dimensions are recorded and later entered into a computer that three-dimensionally models the shape of the pool and determines the shape of the various pieces of liner that are needed to correspond to the pool. Pieces of liner are cut accordingly and welded to form the custom liner. Typically the liner is made slightly smaller than the actual size of the pool so that the liner can be vacuum fitted to the walls and bottom of the pool and stretched slightly to achieve a wrinkle-free fit. However, if the liner is too small or too large, it will not fit properly in the pool and a new liner may need to be made. Thus, the measurement of the pool, which is limited by the skill and care of the contractor and the precision of the measuring tape, can lead to expensive mistakes if not carefully conducted.

Thus, there exists a need for an improved device and method for measuring a swimming pool in connection with the manufacture of a fitted liner therefor. The device and method should minimize inaccuracies that are caused by human error, such as those resulting from improper measurement by the contractor measuring the pool.

SUMMARY OF THE INVENTION

The present invention provides a device and method for measuring a swimming pool using sonar measuring technology, e.g., so that a custom-fit liner can be manufactured to fit the pool. The device can minimize or eliminate the number of measurements that must be made manually, thereby reducing measurement inaccuracies and possibly reducing the time required for measurement.

According to one embodiment of the present invention, the device includes a transducer adapted to be placed in the pool and to transmit sonic energy in three-dimensionally diverging directions toward multiple inner surfaces of the pool. The transducer receives reflections of the sonic energy from the multiple surfaces to determine relative positions of a plurality of coordinate points defined by the multiple surfaces. A memory device is configured to receive coordinate data from the transducer and store the coordinate data. The coordinate data is characteristic of the positions of the coordinate points on the multiple surfaces of the pool. For example, the memory device can be positioned remotely from the transducer, and a wireless transmitter can be configured to transmit the coordinate data from the transducer to the memory device. A communication device is adapted to communicate the coordinate data to a liner cutting device configured to cut liner material to sizes corresponding to the multiple inner surfaces of the pool.

For example, the transducer can be configured to transmit the sonic energy in at least a hemispheric directional field and receive the reflections from the hemispheric field. The transducer can determine coordinate data relative to one or more reference portions of the pool so that the transducer can determine a location of the multiple surfaces of the pool relative to the reference position from multiple positions of the transducer. A reference marker also can be provided to reflect sonic energy toward the transducer so that the transducer can determine the coordinate data relative to the reference marker. The transducer can be configured to determine the coordinate data corresponding to the inner surfaces of the pool with a great deal of accuracy, e.g., an accuracy of within about 1 inch.

According to one aspect of the present invention, a processing device can be configured to receive the coordinate data from the memory device, determine from the coordinate data two-dimensional measurements of the inner surfaces of the pool, and control a liner cutting device to cut portions of liner material to sizes corresponding to the two-dimensional measurements of the inner surfaces.

The present invention also provides a method of measuring a swimming pool in connection with the manufacture of a custom-fit liner for the pool. The method includes transmitting sonic energy from a transducer in three-dimensionally diverging directions toward multiple inner surfaces of the pool. Reflections of the sonic energy from the multiple surfaces are received to determine relative positions of a plurality of coordinate points defined by the multiple surfaces. For example, the transducer can transmit and receive the sonic energy to and from a hemispheric directional field. The coordinate data is electronically communicated from the transducer, e.g., by wirelessly communication from the transducer to a remote memory device, where the coordinate data is stored. The coordinate data is then used to control the cutting of liner material to sizes corresponding to the multiple inner surfaces of the pool. In some cases, the coordinate data can correspond to 25 points or more on the inner surfaces of the pool, and the coordinate data can correspond to the inner surfaces of the pool with an accuracy of within 1 inch.

The transducer can transmit and receive sonic energy at different positions in the pool relative to a reference position. In some cases, a reference marker is provided at a fixed position relative to the pool and directed generally toward the transducer so that the reference marker reflects sonic energy toward the transducer and the transducer determines the coordinate data relative to the reference marker.

According to one aspect of the invention, two-dimensional measurements of the inner surfaces of the pool are determined from the coordinate data. Portions of liner material are cut to sizes corresponding to the two-dimensional measurements of the inner surfaces. The portions of the liner material are connected to form a three-dimensional configuration corresponding to the pool.

BRIEF DESCRIPTION OF THE DRAWINGS

The foregoing and other advantages and features of the invention, and the manner in which the same are accomplished, will become more readily apparent upon consideration of the following detailed description of the invention taken in conjunction with the accompanying drawings, which illustrate preferred and exemplary embodiments, but which are not necessarily drawn to scale, wherein.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
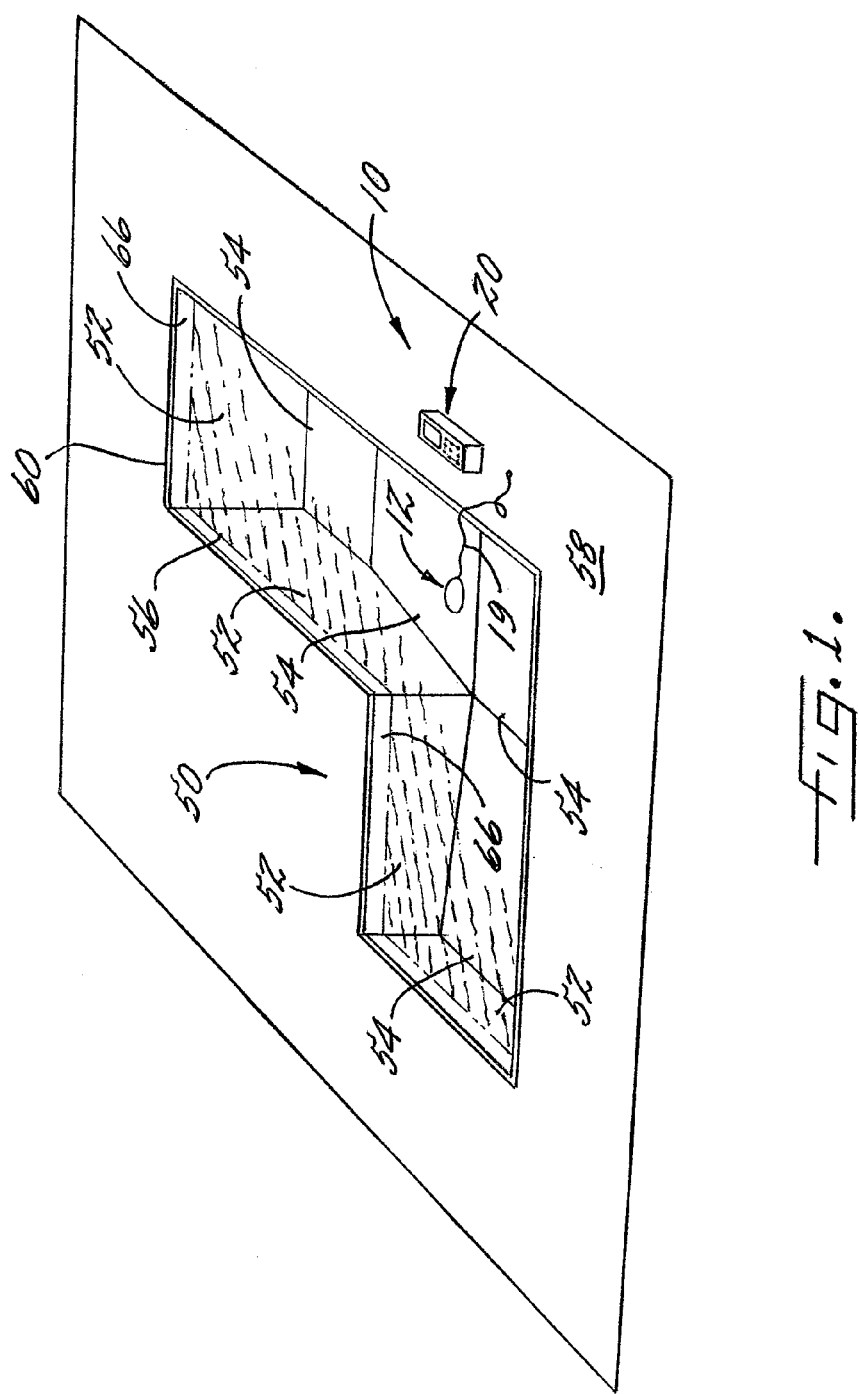
FIG. 1 is a perspective view illustrating an apparatus for using sonar to measure a swimming pool according to one embodiment of the present invention.

Referring to the drawings and in particular to FIG. 1, there is shown an apparatus 10 for measuring a swimming pool 50 according to one embodiment of the present invention. The apparatus 10 can be used to measure various configurations of swimming pools. For example, as shown in FIG. 1, the swimming pool 50 is L-shaped and defines multiple inner surfaces including sides 52 and bottom surfaces 54. The pool 50 can include a continuous liner 66 that is disposed on the sides 52 and bottom surfaces 54 of the pool 50 to form a waterproof barrier to prevent water from leaking through the sides 52 or bottom surfaces 54. In other embodiments of the present invention, the pool 50 can define other configurations, including configurations in which some of the sides 52 or bottom surfaces 54 are curved to define convex or concave surfaces.

The apparatus 10 includes a transducer device 12 and a handheld information storage device 20. The transducer 12 can be configured to float on the surface 56 of the water in the pool 50 so that the apparatus 10 can be used to measure the pool 50 when the pool 50 contains water. Alternatively, the transducer 12 can be suspended in or above the water. Further, the transducer 12 can be configured to measure the pool 50 even when the pool 50 does not contain water, in which case the transducer 12 can be suspended in or over the pool 50, or placed in contact with the surfaces 52, 54 of the pool 50.

Figure 4:
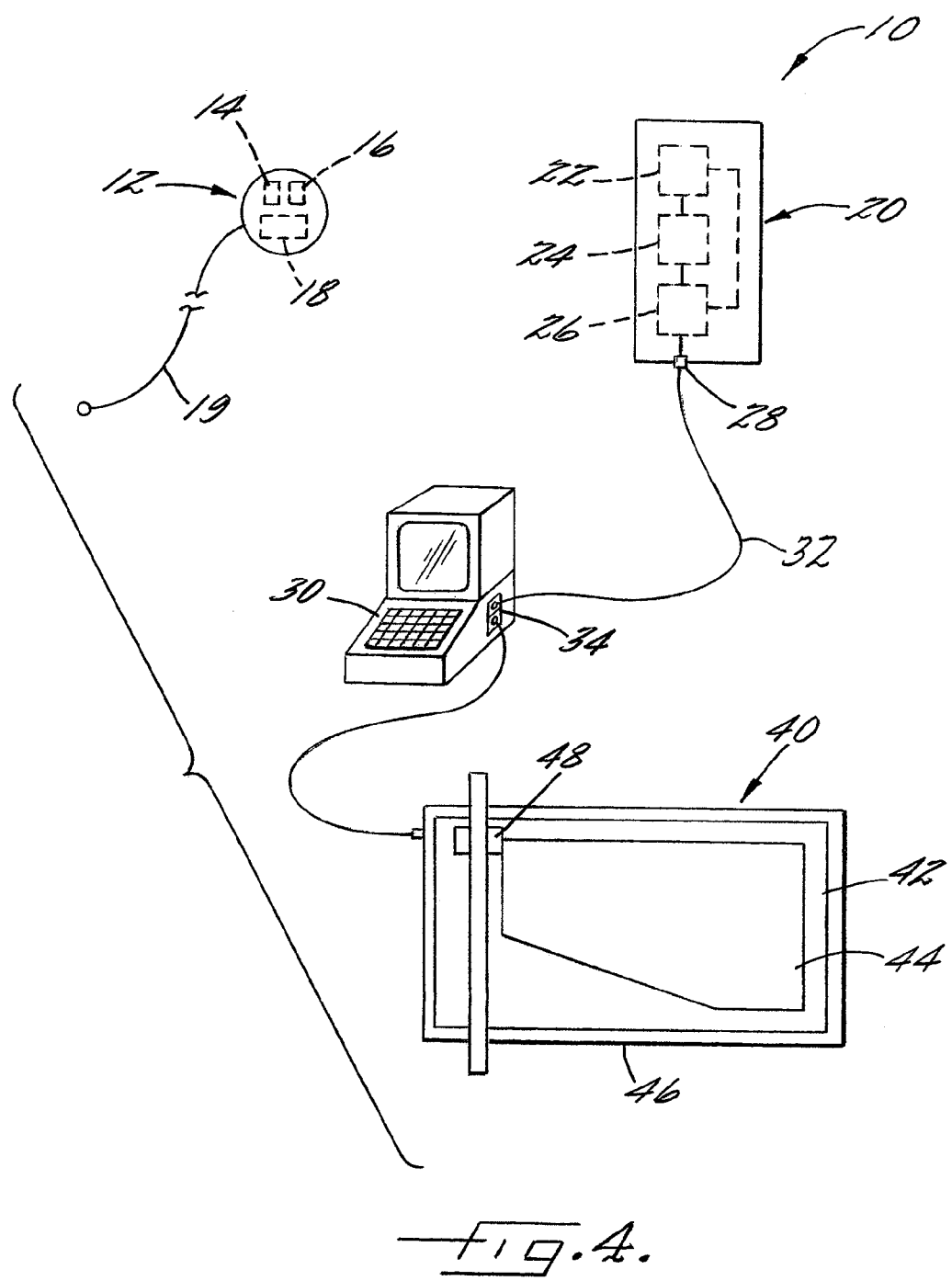
FIG. 4 is a schematic view illustrating an apparatus for manufacturing a custom-fit pool liner according to one embodiment of the present invention.

The transducer 12 is configured to perform sonar mapping, i.e., sonic measurement, of the pool 50. Conventional sonar mapping technology has been developed, e.g., for sonar measurement devices used by fishermen to chart the contour of a body of water and detect the presence of fish or other objects under the surface of the water. For example, sonar fish detection systems are described in U.S. Pat. No. 6,693,847 to Betts and U.S. Pat. No. 5,184,330 to Adams, et al. Generally, the transducer 12 of the present invention transmits sonic energy and receives reflections of the sonic energy that are reflected by the inner surfaces 52, 54 of the pool 50. In this regard, the transducer 12 includes a sonic transmitter 14 and a receiver 16, as shown in FIG. 4, which can operate at sonic frequencies such as those between about 1 kHz and 500 kHz, typically between about 120 kHz and 250 kHz. The transmitter 14 and receiver 16 can alternatively comprise a single device, i.e., a transceiver capable of transmitting and receiving sonic energy.

Figure 2:
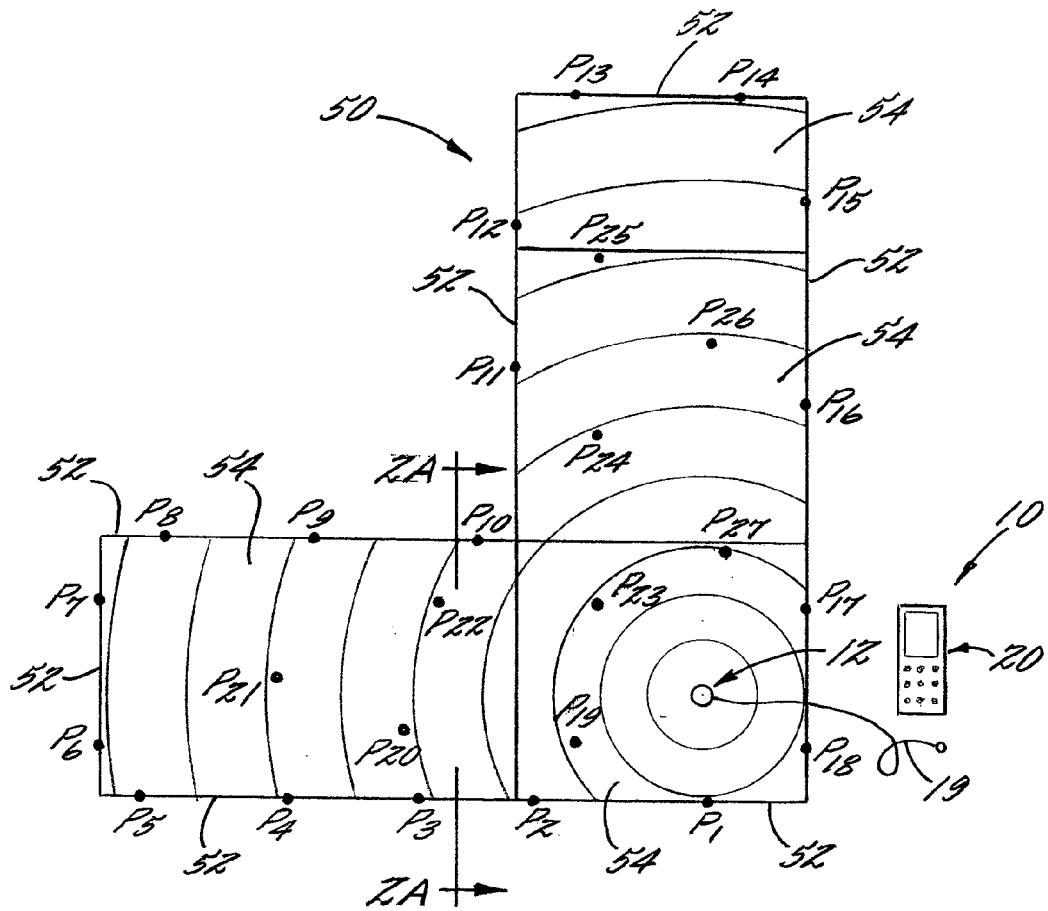
FIG. 2 is a plan view illustrating the apparatus of FIG. 1 and showing a graphical representation of the sonic waves and a plurality of points on the inner surfaces of the pool measured by the apparatus.
Figure 2A:
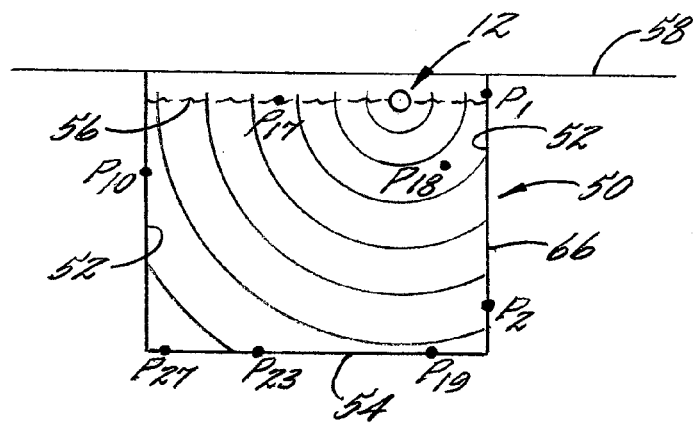
FIG. 2A is a section view as indicated by line 2A-2A of FIG. 2.

The transducer 12 transmits the sonic energy in three-dimensionally diverging directions toward multiple inner surfaces 52, 54 of the pool 50 and receives reflections of the sonic energy from the multiple surfaces 52, 54. Further, the transducer 12 can determine the distance between the transducer 12 and each of the surfaces 52, 54, i.e., according to the time between the transmission of sonic energy and the reflection that is received from a particular direction. Thus, the transducer 12 can determine relative positions of a plurality of coordinate points defined by the multiple surfaces 52, 54. For example, as shown in FIGS. 2 and 2A, the transducer 12 can transmit sonic energy throughout a hemispherical directional field toward the entire inner surfaces 52, 54 of the pool 50 so that the reflections of the sonic energy are received by the transducer 12 from a plurality of points $P_1$-$P_{27}$ on the surfaces 52, 54. The transducer 12 can detect the locations of any number of points on the surfaces 52, 54, e.g., more than 25 points and typically more than 100 points.

Figures 3, 3A:
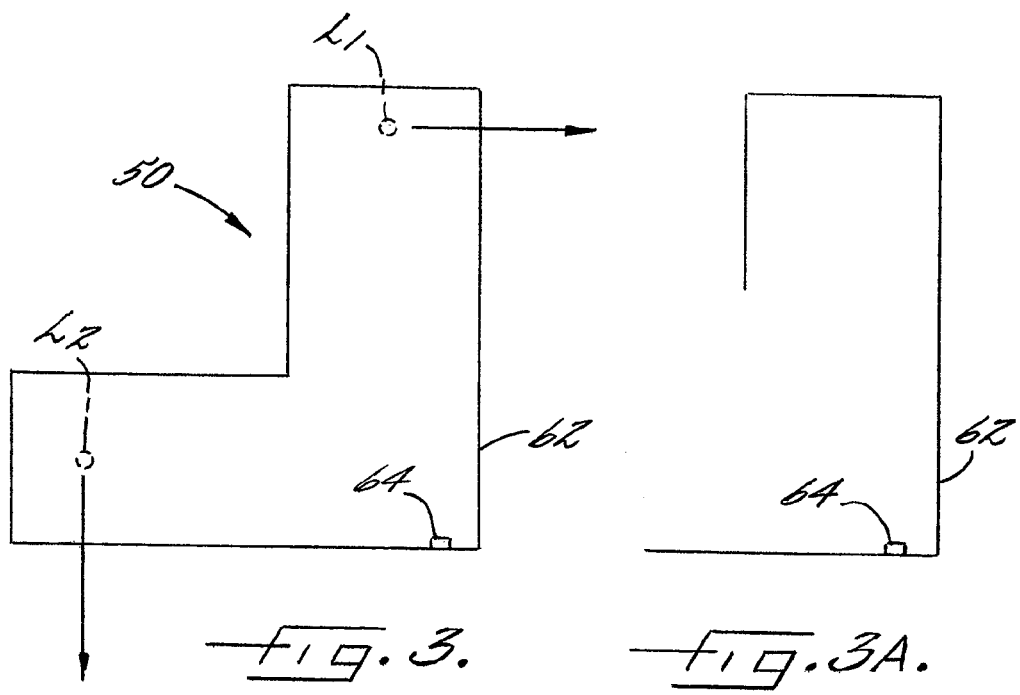
FIG. 3 is a plan view illustrating the swimming pool of FIG. 1 and showing two possible positions of the transducer.
FIG. 3A is a plan view graphically illustrating a portion of the swimming pool as represented by the coordinate data collected by the apparatus of FIG. 1 while the transducer is in the first position of FIG. 3.
Figure 3B:
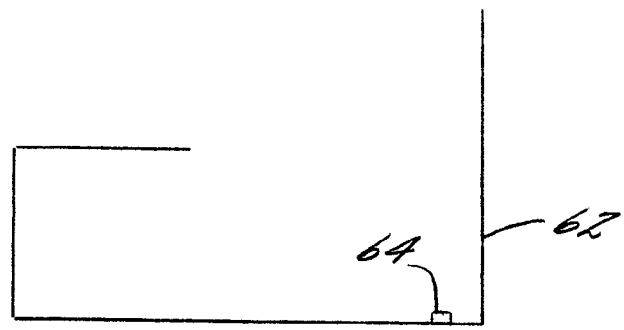
FIG. 3B is a plan view graphically illustrating a portion of the swimming pool as represented by the coordinate data collected by the apparatus of FIG. 1 while the transducer is in the second position of FIG. 3.

As illustrated in FIG. 2, the transducer 12 can be positioned in the pool 50 at a location from which the entire pool 50 can be measured. From such a position, the transducer 12 can transmit sonic energy and receive reflections from points, such as $P_1$-$P_{27}$, throughout the entire pool 50, thereby collecting coordinate data corresponding to each of the surfaces 52, 54 of the pool 50. It is appreciated that the layout of some pools precludes coordinate data from being collected practically for the entire pool from a single position of the transducer 12. For example, the transducer 12 may be unable to measure all of the inner surfaces 52, 54 from one location in a pool with multiple curved or angled portions or a pool having a toroidal shape. In these cases, the transducer 12 can be used in different positions to collect coordinate data for different parts of the pool. Further, even if the pool can be measured from a single position, it may be desired to successively position the transducer 12 in various locations throughout the pool, e.g., to achieve improved accuracy of measurement. As shown in FIG. 3, the transducer 12 can be positioned at a first location $L_1$ from which the transducer 12 is used to collect coordinate data for part of the pool 50, as represented by FIG. 3A. That is, from the first location $L_1$, the transducer 12 maps only that portion of the pool 50 illustrated in FIG. 3A. The transducer 12 can then be positioned at a second location $L_2$ from which the transducer 12 is used to collect coordinate data for another part of the pool 50, as represented by FIG. 3B. As evident from the combination of FIGS. 3A and 3B, the total coordinate data collected by the transducer 12 in combination from the two locations $L_1$ and $L_2$ corresponds to the contour of the entire pool 50. The transducer 12 can separately maintain the coordination data from the first and second locations $L_1$, $L_2$, or the transducer 12 can combine the coordination data to produce a single set, or map, of coordination data that corresponds to the entire pool 50.

Further, the transducer 12 can be capable of recognizing one or more reference portions of the pool 50, such as a corner of the pool 50, and determining the coordinate data relative to the reference portions. If one or more of the reference portions can be detected by the transducer 12 while the transducer 12 is in different positions in the pool 50, the transducer 12 can reference the coordinate data collected in the various positions according to the same reference portions. For example, as shown in FIGS. 3, 3A, 3B, a corner 62 of the pool 50 can be detected by the transducer 12 while the transducer 12 is in the first and second positions $L_1$, $L_2$. Thus, the transducer 12 can reference the coordinate data collected from the first and second locations $L_1$, $L_2$ according to the corner 62 of the pool 50.

According to one embodiment of the present invention, one or more reference markers 64 can be provided for referencing by the transducer 12. Each reference marker 64 can serve a function similar to the reference portions of the pool 50 in that the marker 64 provides an easily recognizable reference point according to which the transducer 12 can reference the coordinate data. As shown in FIG. 3, the reference marker 64 can be positioned at a location such that the transducer 12 can receive sonic energy reflected by the reference marker 64 while the transducer 12 is in various locations throughout the pool 50. Each reference marker 64 can be a sonic reflector, i.e., any object that sufficiently reflects the sonic energy transmitted by the transducer 12 and which has a known sonic characteristics, or signature, by which the transducer 12 can recognize the marker 64. For example, the reference marker 64 can have a unique shape or sonic reflectance so that the transducer 12 can easily distinguish the reference marker 64 from other features of the pool 50 or objects that may be in or near the pool 50.

The transducer 12 can be moved throughout the pool 50 by the movement of the water in the pool 50, or the transducer 12 can be moved by a person. For example, the transducer 12 can be connected to a fishing line, lanyard, or other control line 19 by which the transducer 12 can be pulled throughout the pool 50. The transducer 12 can collect coordinate data from a plurality of positions throughout the pool 50, e.g., substantially continuously as the transducer 12 is pulled through the pool 50. Further, the reference marker 64 can be provided at a predetermined height, e.g., at the deck surface 58 of the pool 50 or at the height of a feature on the sides 52 of the pool 50 such as a track 60, which receives the edges of the liner 66 and secures the liner 66 to the pool 50. Thus, the transducer 12 can reference coordinate data relative to the reference marker 64 regardless of the level of the surface 56 of the water in the pool 50 and the position of the transducer 12 in the water.

The transducer 12 is configured to communicate coordinate data representative of the contour of the surfaces 52, 54 of the pool 50 to a data storage device, such as the handheld information storage device 20. For example, the coordinate data can include a plurality of coordinate positions corresponding to points located on the various inner surfaces 52, 54 of the pool 50. The transducer 12 can communicate the coordinate data to the handheld information storage device 20, which can be a separate device from the transducer 12 and positioned remotely therefrom. The handheld unit 20 can also be used to control the transducer 12. Thus, a person can operate the handheld unit 20 from the deck 58 around the pool 50, while the transducer 12 is floated on the surface 56 of the pool 50. As shown in FIG. 4, the transducer 12 includes a communicator 18, such as a wireless communication device that transmits the coordinate data to the handheld unit 20 by a radio frequency signal, such as a 900 MHz or other radio frequency. In other embodiments of the present invention, the transducer 12 and the handheld unit 20 can be connected by wire or otherwise configured to communicate. In any case, the apparatus 10 preferably complies with applicable transmission guidelines, such as those established by the Federal Communication Commission.

As illustrated in FIG. 4, the handheld unit 20 includes a receiver 22 for receiving the wireless communications from the transducer 12 and a memory device 24 in which the coordinate data from the transducer 12 can be stored. Each of the transducer 12 and the handheld unit 20 can include other components such as a liquid crystal display (LCD) or other display device, buttons or switches by which the operation of the devices can be controlled, a battery or other power source, and the like. For example, the LCD can be used to display the operational status of the handheld unit 20 and/or the transducer 12 including such operational aspects as the quantity and quality of data collected with the transducer 12, the strength of the signal from the transducer 12, a graphical illustration of the coordinate data collected from the transducer 12, and the like.

The handheld unit 20 also includes a communication device 26 that is adapted to communicate the coordinate data therefrom. For example, as shown in FIG. 4, the handheld device 20 can communicate the coordinate data to a liner cutting device 40 configured to cut liner material 42 to sizes corresponding to the multiple inner surfaces 52, 54 of the pool 50. More particularly, the handheld device 20 can be electrically connected to a processing device 30, such as a computer, that is configured to control the liner cutting device 40. For example, the communication device 26 can include an output data port 28 that is connected by an electrical cable 32 to an input port 34 of the processing device 30. Thus, the handheld device 20 can electrically communicate the coordination data to the processing device 30, and the processing device 30 can control the liner cutting device 40 to produce portions 44 of the liner material 42 that correspond to the dimensions of the inner surfaces 52, 54 of the pool 50.

Figure 5:
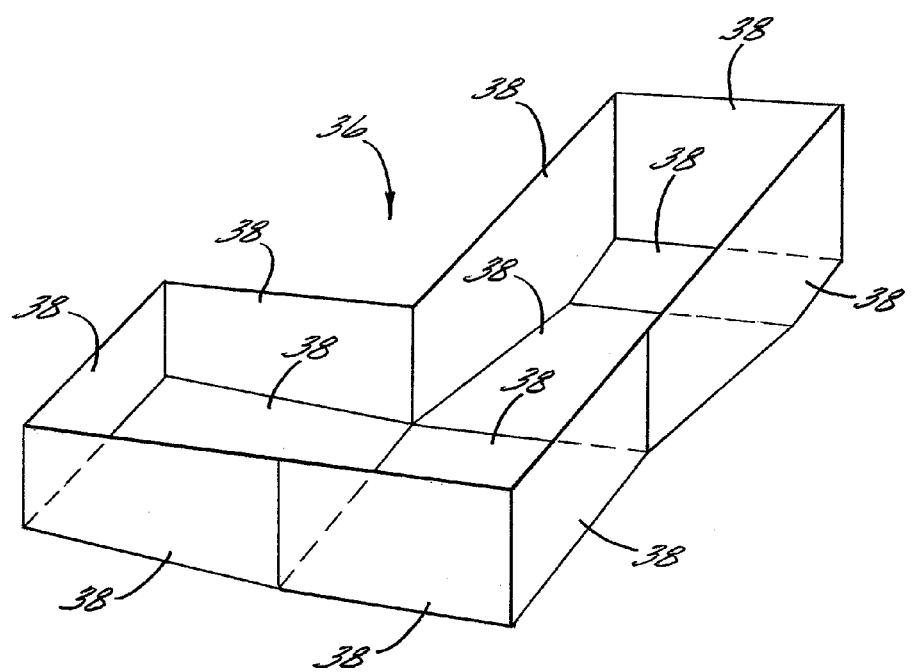
FIG. 5 is a perspective view illustrating a three-dimensional model of the swimming pool and the corresponding pool liner formed according to one embodiment of the present invention.

The liner cutting device 40 can be a conventional machine, and the processing device 30 can use conventional software designed for receiving the geometric data and controlling the cutting device accordingly. For example, the processing device 30 can be programmable computer configured to operate according to a computer aided design (CAD) program. In particular, the processing device 30 can be configured to operate with software such as such the EPDS "Pool Design Suite" software available from Eastman Machine Company, of Buffalo, N.Y., which can be used in conjunction with a CAD program such as AutoCAD® 2000 or other software tools, a registered trademark of Autodesk, Inc. of San Rafael, Calif. The processing device 30 controls a cutting device such as the EC3 Conveyor Cutting Continuous-Feed System, also available from Eastman Machine Company. In any case, the processing device 30 can receive the coordination data and use the data to construct a three-dimensional model 36 of the pool 50, as shown in FIG. 5, that includes a plurality of planar or curved surfaces 38 or portions corresponding to the inner surfaces 52, 54 of the pool 50. In this regard, the processing device 30 can fit model surfaces to the coordinate points represented by the coordination data. In some cases, the processing device 30 can perform this fitting operation by interpolating between the plurality of coordination points and/or extrapolating beyond the coordination points, i.e., to determine where the various surfaces 52, 54 intersect. The processing device 30 also determines two-dimensional measurements of the inner surfaces 52, 54 of the pool 50. That is, the processing device 30 can determine the length, width, perimeter, or other geometric measurements of the individual surfaces 38 and, hence, the dimensions of the inner surfaces 52, 54.

Figure 6:
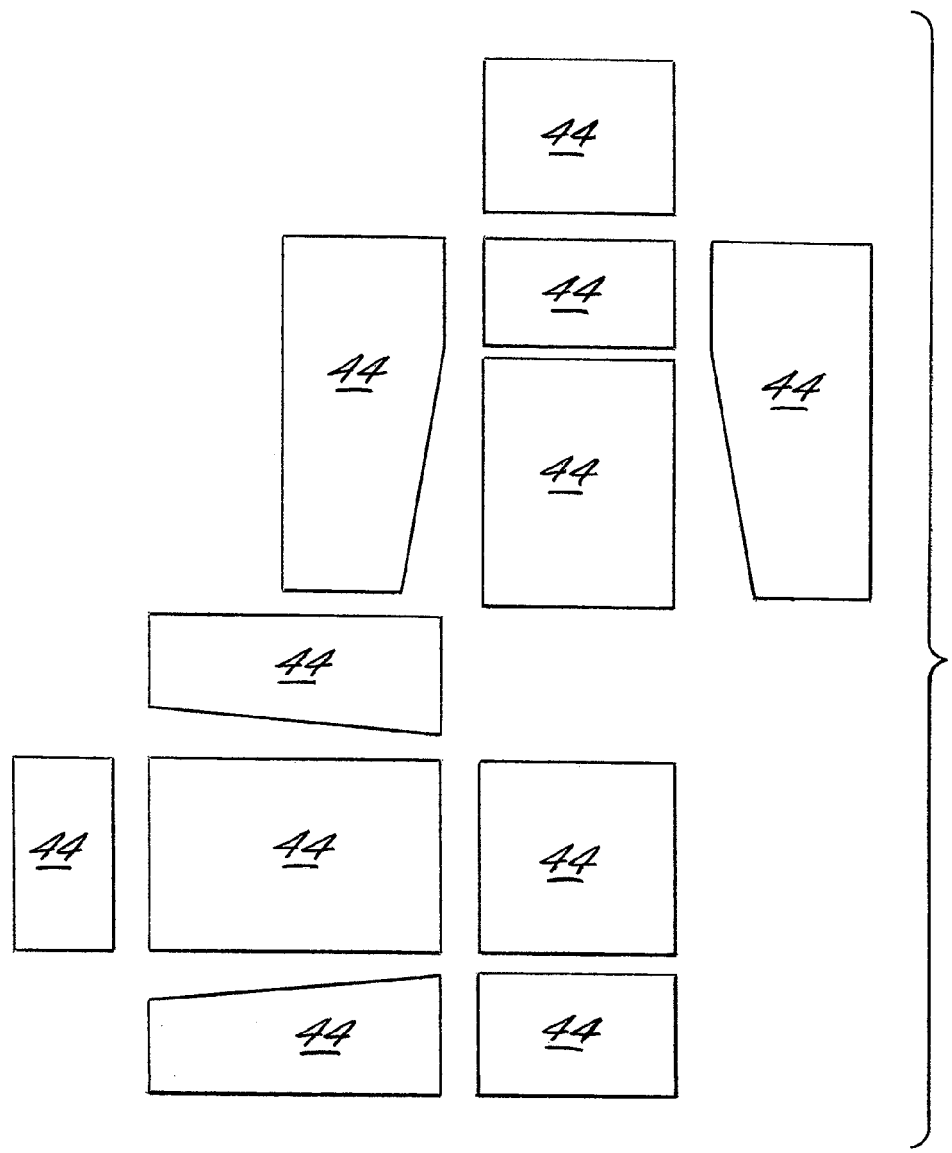
FIG. 6 is a plan view illustrating the plurality of two-dimensional portions of pool liner material used to form a three-dimensional liner according to one embodiment of the present invention.

The processing device 30 controls the liner cutting device 40 to cut portions 44 of liner material 42 to sizes corresponding to the two-dimensional measurements of the inner surfaces 52, 54. Typically, the cutting device 40 includes a table 46 or other support for a single piece or continuous web of the liner material 42 so that a cutting tool 48 with a blade or other cutting device can be used to automatically cut the liner material 42 according to the dimensions provided by the processing device 30. As shown in FIG. 6, each portion 44 of the liner material 42 can correspond to one surface 52, 54 of the pool 50 or to more or less than one surface 52, 54, e.g., depending on the size of the surfaces 52, 54, the configuration of the surfaces 52, 54, the size of the stock liner material 42, the size of the liner cutting device 40, and the like. The various portions 44 of the liner material 42 can then be connected by welding or other connection methods to produce a three-dimensional pool liner 66 corresponding to the size and shape of the pool 50. That is, the portions 44 illustrated in FIG. 6 can be assembled and connected to form a three-dimensional liner with a configuration similar to that of the model 36 of FIG. 5. Thus, the liner 66 can be disposed in the pool 50 and attached to the surfaces 52, 54 of the pool 50, e.g., using vacuum fitting, to provide a custom-fit, wrinkle-free waterproof barrier for the pool 50. It is appreciated that the pool liner 66 can be formed of liner material 42 formed of various materials and characterized by a variety of colors, decorative patterns, thickness, and the like. Typically, the liner material 42 is vinyl, such as PVC.

The apparatus 10 can be used to determine the dimensions of the pool 50 with high accuracy. For example, the apparatus 10 can be configured to determine the position of the coordinate points to an accuracy of within about 1 inch, and any number of coordination points can be measured. Further, the apparatus 10 can operate without draining water from the pool 50 and, in some cases, can determine complex contours that would be difficult or impossible to accurately measure using a measuring tape or other conventional device.

Many modifications and other embodiments of the invention will come to mind to one skilled in the art to which this invention pertains having the benefit of the teachings presented in the foregoing descriptions and the associated drawings. For example, it is appreciated that the device can include additional or fewer components than those illustrated. In particular, some of the components of the apparatus 10 can be integral. For example, the handheld unit 20 can be programmed to perform some or all of the functions of the processing device 30. Alternatively, the memory 24 can be housed integrally with the transducer 12, so that the transducer 12 can store the coordination data and subsequently can be connected directly to the processing device 30 without the use of the handheld unit 20. Further, while the transducer 12 is illustrated as a single component that includes the transmitter 14 and a receiver 16, the transmitter 14 and receiver 16 can alternatively be located remotely from one another and additional transmitters and/or receivers can be used. These and other components of the apparatus 10 can communicate via wire connections or other modes of communication such as radio frequency communication. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A device for sonar measurement of a swimming pool in connection with manufacturing a custom-fit liner for the pool, the device comprising:

a transducer adapted to be placed in the pool, the transducer configured to transmit sonic energy in three-dimensionally diverging directions toward multiple inner surfaces of the pool and receive reflections of the sonic energy from the multiple surfaces to determine relative positions of a plurality of coordinate points defined by the multiple surfaces;

a memory device configured to receive coordinate data from the transducer and store the coordinate data, the coordinate data being characteristic of the positions of the coordinate points on the multiple surfaces of the pool; and a communication device adapted to communicate the coordinate data to a liner cutting device configured to cut liner material to sizes corresponding to the multiple inner surfaces of the pool.

2. A device according to claim 1 further comprising a wireless transmitter configured to transmit the coordinate data from the transducer to the memory device, the memory device being positioned remotely from the transducer.

3. A device according to claim 1 wherein the transducer is configured to float in water in the pool and transmit the sonic energy through the water toward the inner surfaces of the pool.

4. A device according to claim 1 wherein the transducer is configured to determine the coordinate data relative to at least one reference portion of the pool such that the transducer is adapted to determine a location of the multiple surfaces of the pool relative to the reference position from at least two different positions of the transducer.

5. A device according to claim 1 further comprising a reference marker adapted to reflect sonic energy toward the transducer such that the transducer is configured to determine the coordinate data relative to the reference marker.

6. A device according to claim 1 wherein the transducer is configured to determine coordinate data corresponding to at least 25 points defined by the inner surfaces of the pool and the memory device is configured to store the coordinate data corresponding to each of the 25 points.

7. A device according to claim 1 wherein the transducer is configured to transmit the sonic energy in at least a hemispheric directional field and receive the reflections thereof from the hemispheric field.

8. A device according to claim 1 wherein the transducer is configured to determine the coordinate data corresponding to the inner surfaces of the pool with an accuracy of within 1 inch.

9. A device according to claim 1 further comprising a processing device configured to control the liner cutting device, the processing device configured to receive the coordinate data from the memory device and determine from the coordinate data two-dimensional measurements of the inner surfaces of the pool, the processing device controlling the liner cutting device to cut portions of liner material to sizes corresponding to the two-dimensional measurements of the inner surfaces.

10. A method of manufacturing a custom-fit liner for a swimming pool, the method comprising:
   transmitting sonic energy from a transducer in three-dimensionally diverging directions toward multiple inner surfaces of the pool;
   receiving reflections of the sonic energy from the multiple surfaces to determine relative positions of a plurality of coordinate points defined by the multiple surfaces;
   storing coordinate data characteristic of the positions of the coordinate points on the multiple surfaces of the pool; and
   cutting liner material according to the coordinate data such that the liner material corresponds in size to the multiple inner surfaces of the pool.

11. A method according to claim 10 further comprising electronically communicating the coordinate data from the transducer to the memory device, the memory device being positioned remotely from the transducer.

12. A method according to claim 11 wherein said electronically communicating step comprises wirelessly communicating the coordinate data from the transducer to the memory device.

13. A method according to claim 10 further comprising floating the transducer in water in the pool such that the transducer transmits the sonic energy through the water toward the inner surfaces of the pool.

14. A method according to claim 10 further comprising repeating said transmitting and receiving steps with the transducer in different positions in the pool and wherein each receiving step comprises determining the coordinate data relative to at least one reference portion of the pool such that the transducer is adapted to determine a location of the multiple surfaces of the pool relative to the reference position from each position of the transducer.

15. A method according to claim 10 further comprising providing a reference marker at a fixed position relative to the pool, the reference marker being directed generally toward the transducer such that the reference marker reflects sonic energy toward the transducer and the transducer determines the coordinate data relative to the reference marker.

16. A method according to claim 10 wherein said receiving step comprises determining coordinate data corresponding to at least 25 points defined by the inner surfaces of the pool and storing the coordinate data corresponding to each of the 25 points in a memory device.

17. A method according to claim 10 wherein said transmitting and receiving steps comprise transmitting the sonic energy in at least a hemispheric directional field and receiving the reflections thereof from the hemispheric field.

18. A method according to claim 10 wherein said receiving step comprises determining the coordinate data corresponding to the inner surfaces of the pool with an accuracy of within 1 inch.

19. A method according to claim 10 further comprising:
   determining from the coordinate data two-dimensional measurements of the inner surfaces of the pool;
   cutting portions of liner material to sizes corresponding to the two-dimensional measurements of the inner surfaces; and
   connecting the portions of the liner material to form the liner with a three-dimensional configuration corresponding to the pool.

20. A method of measuring a swimming pool in connection with manufacturing a custom-fit liner for the pool, the method comprising:
   floating a transducer in water in the pool;
   transmitting sonic energy from the transducer in three-dimensionally diverging directions toward multiple inner surfaces of the pool;
   receiving by the transducer reflections of the sonic energy from the multiple surfaces to determine relative positions of a plurality of coordinate points defined by the multiple surfaces;
   electronically communicating coordinate data from the transducer to a memory device positioned remotely from the transducer, the coordinate data being characteristic of the positions of the coordinate points on the multiple surfaces of the pool; and
   storing the coordinate data in the memory device.

21. A method according to claim 20 wherein said electronically communicating step comprises wirelessly communicating the coordinate data from the transducer to the memory device.

22. A method according to claim 20 further comprising providing a reference marker at a fixed position relative to the pool, the reference marker being directed generally toward the transducer such that the reference marker reflects sonic energy toward the transducer and the transducer determines the coordinate data relative to the reference marker.

23. A method according to claim 20 further comprising repeating said transmitting and receiving steps with the transducer in different positions in the pool, wherein each receiving step comprises determining the coordinate data relative to at least one reference portion of the pool such that the transducer is adapted to determine a location of the multiple surfaces of the pool relative to the reference position from each position of the transducer.

24. A method according to claim 20 wherein said receiving step comprises determining coordinate data corresponding to at least 25 points defined by the inner surfaces of the pool and storing the coordinate data corresponding to each of the 25 points in the memory device.

25. A method according to claim 20 wherein said transmitting and receiving steps comprise transmitting the sonic energy in at least a hemispheric directional field and receiving the reflections thereof from the hemispheric field.

26. A method according to claim 20 further comprising:
determining from the coordinate data two-dimensional measurements of the inner surfaces of the pool;
cutting portions of liner material to sizes corresponding to the two-dimensional measurements of the inner surfaces; and
connecting the portions of the liner material to form the liner with a three-dimensional configuration corresponding to the pool.

* * * * *